(12) United States Patent
Kuroda et al.

(10) Patent No.: US 6,631,104 B2
(45) Date of Patent: Oct. 7, 2003

(54) APPARATUS FOR AND METHOD OF ADDING INFORMATION ONTO RECORDING MEDIUM THAT ENABLES ADDITIONAL RECORDING

(75) Inventors: Kazuo Kuroda, Tokyo-to (JP); Toshio Suzuki, Tokyo-to (JP)

(73) Assignee: Pioneer Electronic Corporation, Tokyo (JP)

( * ) Notice: Subject to any disclaimer, the term of this patent is extended or adjusted under 35 U.S.C. 154(b) by 183 days.

(21) Appl. No.: 09/900,180

(22) Filed: Jul. 9, 2001

(65) Prior Publication Data

US 2003/0058760 A1 Mar. 27, 2003

Related U.S. Application Data

(63) Continuation of application No. 09/324,100, filed on Jun. 2, 1999, now Pat. No. 6,269,059.

(30) Foreign Application Priority Data

Jun. 2, 1998 (JP) .......................... P10-152546

(51) Int. Cl.⁷ ................................ G11B 5/09
(52) U.S. Cl. ................ 369/47.28; 369/53.34; 369/124.14
(58) Field of Search .............. 369/47.15, 47.28, 369/47.38, 47.4, 47.48, 47.47, 47.31, 53.31, 53.34, 124.14, 32.01

(56) References Cited

U.S. PATENT DOCUMENTS 5,073,880 A 12/1991 Maeda et al.
5,875,163 A 2/1999 Kuroda et al.
5,901,123 A 5/1999 Taniguchi et al.
6,081,490 A 6/2000 Kuroda et al.

*Primary Examiner*—Paul W. Huber
(74) *Attorney, Agent, or Firm*—Young & Thompson

(57) ABSTRACT

An apparatus for recording first information onto a recording medium, successively to second information that has been already recorded on the recording medium is provided. The first and second information are divided into a plurality of blocks. Each block includes a synchronization signal. This signal is located at a predetermined position in each block. A plurality of pre-pits are pre-formed on the recording medium at intervals of the predetermined length or an integer times the predetermined length. A reference signal with a predetermined frequency is pre-recorded on the recording medium. The apparatus has: a write clock signal generating device for generating a write clock signal on the basis of the reference signal; a pre-pit detecting device for detecting the pre-pits and outputting a pre-pit signal at a first timing, which is equal to a timing that each pre-pit is detected; a synchronization signal generating device for generating the synchronization signal and outputting the synchronization signal at a second timing synchronized with the write clock signal, and which is set so as to place the synchronization signal at the predetermined position in each block; a time relationship detecting device for detecting a time relationship between the pre-pit signal and the synchronization signal; a shifting device for shifting a phase of the write clock signal so as to make the detected time relationship equal to a predetermined time relationship; and a recording device for recording the first information and the synchronization signal onto the recording medium in accordance with the second timing.

8 Claims, 11 Drawing Sheets

APPARATUS FOR AND METHOD OF ADDING INFORMATION ONTO RECORDING MEDIUM THAT ENABLES ADDITIONAL RECORDING

This application is a continuation of application Ser. No. 09/324,100 filed Jun. 2, 1999, now U.S. Pat. No. 6,269,059 which claimed priority of Japanese application P10-152546 filed Jun. 2, 1998.

BACKGROUND OF THE INVENTION

1. Field of the Invention

The present invention relates to an apparatus for and method of recording information on a recording medium that enables additional recording of information thereon.

2. Description of the Related Art

A write once (WO) type optical disk and rewritable (RW) type optical disk are recording media that enable additional recording of information thereon. The WO type disk is a disk that enables information to be written only once at the same portion thereof. The RW type optical disk is a disk that enables information to be written many times at the same portion thereof.

In an information recording apparatus that writes information data onto a disk enabling additional recording of information, when information data is written onto a disk, a write clock signal is produced. The information recording apparatus then writes information data onto the disk while making a synchronization (e.g., bit synchronization) between the thus-produced and stable write clock signal having a predetermined frequency and the writing operation of writing information data onto the disk. This write clock signal in general is produced by a reference clock generator such as a crystal oscillator enabling the independent generation of an oscillation output.

However, in a case where additionally recording new information data onto the disk in which information data is already partly or locally written, in such a way that the new information data is written successively to this already written information data, there is the possibility that the write clock signal that was used for recording of the already written information data and the write clock signal that is used for recording of the new information data will fall out of phase.

In this case, when performing an operation of reading information data from a disk on which new information data has been written successively to the already written information data, it is difficult to reproduce a synchronization clock signal at or around a portion of connection between the preceding and the succeeding information data. If the synchronization clock signal cannot be reproduced correctly, the information data cannot be read correctly.

Especially, if information data is firstly written onto the disk by a information recording apparatus, and thereafter, another information data is successively written onto the same disk by a different information recording apparatus, the former information data and the later information data are recorded according to two different write clock signals, respectively. Even if the types of those information recording apparatus are the same, the write clock signals generated in the respective information recording apparatuses are actually different from each other not only in phase but also in frequency.

In order to reproduce a synchronization clock signal to be used for reading information data, a PLL (Phase Locked Loop) circuit is used. if preceding data and succeeding data are written onto the disk according to different write clock signals, respectively, the synchronizing operation of the PLL circuit is largely disturbed at or around the portion of connection between such preceding data and succeeding data, when reproducing these data. As a result of this, there is the possibility that a decoder for performing decoding processing of the read data according to the synchronization clock signal of it will inconveniently make an erroneous detection of various data items in the read data.

Also, generally, information data to be written onto a disk is divided into information blocks each having a prescribed size, and a particular synchronization signal is added to each of the information blocks. Accordingly, when reproducing information data from the disk, it is also possible to establish a synchronization based on the particular synchronization signal added to each information block, as well as to make a bit synchronization such as that mentioned above. However, such a particular synchronization signal is also inherently one which has been recorded in the disk with a timing based on the write clock signal. Accordingly, if a preceding particular synchronization signal and succeeding particular synchronization signal are written onto the disk using write clock signals different from each other in phase or frequency, the periodic continuity can not be still obtained.

For example, there is a case where the interval between a particular synchronization signal added to a rearmost region of the preceding information block and a particular synchronization signal added to a foremost region of the succeeding information data irregularly varies due to the difference between the write clock signals. In this case, there is the possibility that when performing reproduction, such difference will be followed by a failure of detection or an erroneous detection.

SUMMARY OF THE INVENTION

An object of the present invention is to provide an information recording apparatus and method which can control recording of information so as to enable written data and its immediately succeeding additionally written data to be smoothly successively reproduced without disturbing the synchronizing operation of synchronizing read data at the time of reproduction.

An information recording apparatus in accordance with the present invention is an apparatus for recording first information onto a recording medium, successively to second information that has been already recorded on the recording medium. Both the first and second information are divided into a plurality of blocks each having a predetermined length. Each of the plurality of blocks includes a synchronization signal. The synchronization signal is located at a predetermined position in each of the plurality of blocks. A plurality of pre-pits are pre-formed on the recording medium at intervals of the predetermined length or an integer times the predetermined length. A reference signal is pre-recorded on the recording medium. The reference signal has a predetermined frequency.

The information recording apparatus includes: a write clock signal generating device for generating a write clock signal on the basis of the reference signal obtained from the recording medium; a pre-pit detecting device for detecting the plurality of pre-pits from the recording medium and outputting a pre-pit signal at a first timing, which is equal to a timing that each of the plurality of pre-pits is detected; a synchronization signal generating device for generating the synchronization signal and outputting the synchronization signal at a second timing, which is synchronized with the write clock signal, and which is set so as to place the synchronization signal at the predetermined position in each of the plurality of blocks; a time relationship detecting device for detecting a time relationship between the pre-pit signal and the synchronization signal; a shifting device for shifting a phase of the write clock signal so as to make the detected time relationship equal to a predetermined time relationship; and a recording device for recording the first information and the synchronization signal onto the recording medium in accordance with the second timing.

In this apparatus, when the first information is recorded onto the recording medium, successively to the second information, the write clock signal is used. This write clock signal is generated on the basis of the reference signal which is pre-recorded on the recording medium. Therefore, the write clock signal which has constant characteristics, e.g. a constant frequency, can be always generated from one recording medium. As a result of this, the first information can be recorded successively to the second information by using the same write clock signal as that used when the second information was recorded. This contributes to the successive reproduction of the second information and first information.

Further, when the first information is recorded successively to the second information, the pre-pit is detected from the recording medium. In response to the detection of the pre-pit, the pre-pit signal is generated and output at the first timing. The first timing is equal to the timing that the pre-pit is detected. Further, the synchronization signal is generated and output at the second timing. The second timing is synchronized with the write clock signal, and set so as to place the synchronization signal at the predetermined position in each of the plurality of blocks.

A time relationship between the pre-pit signal and the synchronization signal is then detected, and the phase of the write clock signal is shifted so as to make the detected time relationship equal to a predetermined time relationship. Namely, since the second timing is synchronized with the write clock signal, shifting the write clock signal causes shifting the second timing, so that the timing that the synchronization signal is output is also shifted. Thus, the predetermined time relationship is established between the pre-pit signal and the synchronization signal. As a result of this, the phase of the synchronization signal always become constant, because the pre-pits are pre-formed on the recording medium at intervals of the predetermined length or an integer times the predetermined length.

Thus, the timing that the synchronization signal is output, i.e., the second timing, is set by using the write clock signal that has an always constant frequency based on the reference signal pre-recorded on the recording medium and by using the pre-pit signal that is always detected at the constant timing based on the pre-pits pre-formed on the recording medium. Therefore, it is possible to set the period and phase of the synchronization signal at a constant period and a constant phase, each time the additional recording is carried out. In accordance with this second timing, the first information and the synchronization signal are recorded successively to the second information. Accordingly, it is possible to control recording of information so as to enable first information and second information to be smoothly successively reproduced without disturbing the synchronizing operation of synchronizing read data at the time of reproduction.

The time relationship between the pre-pit signal and the synchronization signal may be detected by detecting a difference between the first timing and the second timing, and then shifting the phase of the write clock signal so as to remove the difference between the first timing and the second timing.

An eliminating device for eliminating jitters from the reference signal on the basis of the pre-pit signal may be added to the aforementioned information recording apparatus. By adding this device, the stability and accuracy in frequency of the write clock signal can be improved.

The elimination of jitter may be carried out by reducing a phase difference between the reference signal and the pre-pit signal such that the phase difference is within a range of a predetermined tolerance, by shifting a phase of the reference signal.

The above-stated object can be also achieved by an information recording method in accordance with the present invention. The information recording method is a method of recording first information onto a recording medium, successively to second information that has been already recorded on the recording medium. The method has the processes of: generating a write clock signal on the basis of the reference signal obtained from the recording medium; detecting the plurality of pre-pits from the recording medium and outputting a pre-pit signal at a first timing, which is equal to a timing that each of the plurality of pre-pits is detected; generating the synchronization signal and outputting the synchronization signal at a second timing, which is synchronized with the write clock signal, and which is set so as to place the synchronization signal at the predetermined position in each of the plurality of blocks; detecting a time relationship between the pre-pit signal and the synchronization signal; shifting a phase of the write clock signal so as to make the detected time relationship equal to a predetermined time relationship; and recording the first information and the synchronization signal onto the recording medium (1) in accordance with the second timing.

Thus, the timing that the synchronization signal is output, i.e., the second timing, is set by using the write clock signal that has an always constant frequency based on the reference signal pre-recorded on the recording medium and by using the pre-pit signal that is always detected at the constant timing based on the pre-pits pre-formed on the recording medium. Therefore, it is possible to set the period and phase of the synchronization signal at a constant period and a constant phase, each time the additional recording is carried out. In accordance with this second timing, the first information and the synchronization signal are recorded successively to the second information. Accordingly, it is possible to control recording of information so as to enable first information and second information to be smoothly successively reproduced without disturbing the synchronizing operation of synchronizing read data at the time of reproduction.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Embodiments of the present invention will now be described with reference to the drawings.

Figure 1:
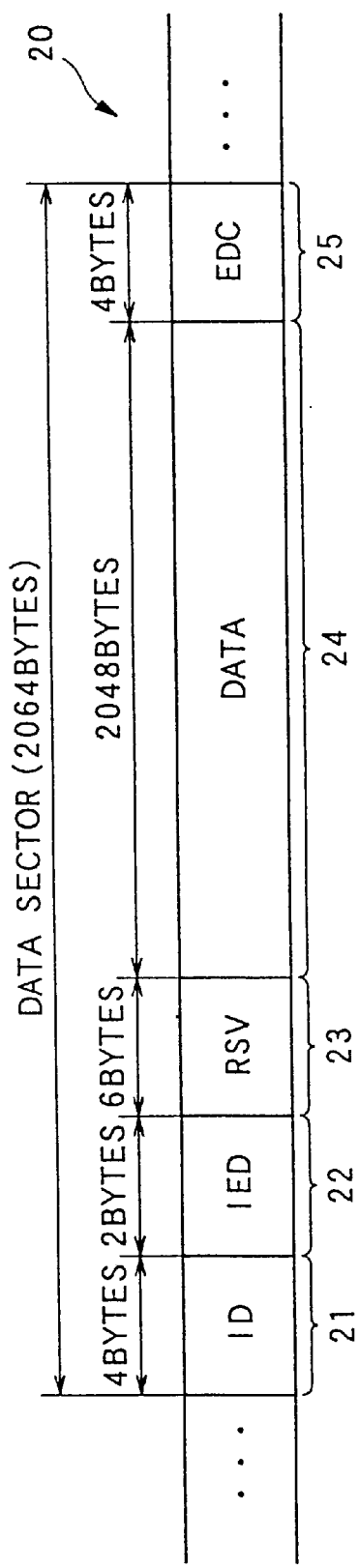
FIG. 1 is a view illustrating the structure of a data sector of recording information that is recorded in a DVD-R.

FIG. 1 shows the structure of a data sector in a general physical data format of a DVD-R (DVD-Recordable). The DVD-R is one of recording media enabling additional recording of data thereon.

Error correction processing that is executed with respect to the DVD-R is executed using an ECC (Error Correction Code) block as a unit of the error correction processing. This ECC block is formed based on a data sector.

Information (recording information) that is recorded on the DVD-R is constructed of a plurality of data sectors 20. One data sector 20 is constructed of: an ID information 21 indicating the starting position of the data sector 20; an ID information error detection code (IED: ID Error Detection Code) 22 for correcting the error of this ID information 21; reserve data 23; data 24 that is main information to be recorded in the DVD-R, such as video/audio, or computer, data; and an error detection code (EDC: Error Detection Code) 25 for detecting the errors in the data 24, and these information, code and data are arrayed in this order. The recording information is formed as sequence of the plurality of data sector 20.

Figure 2:
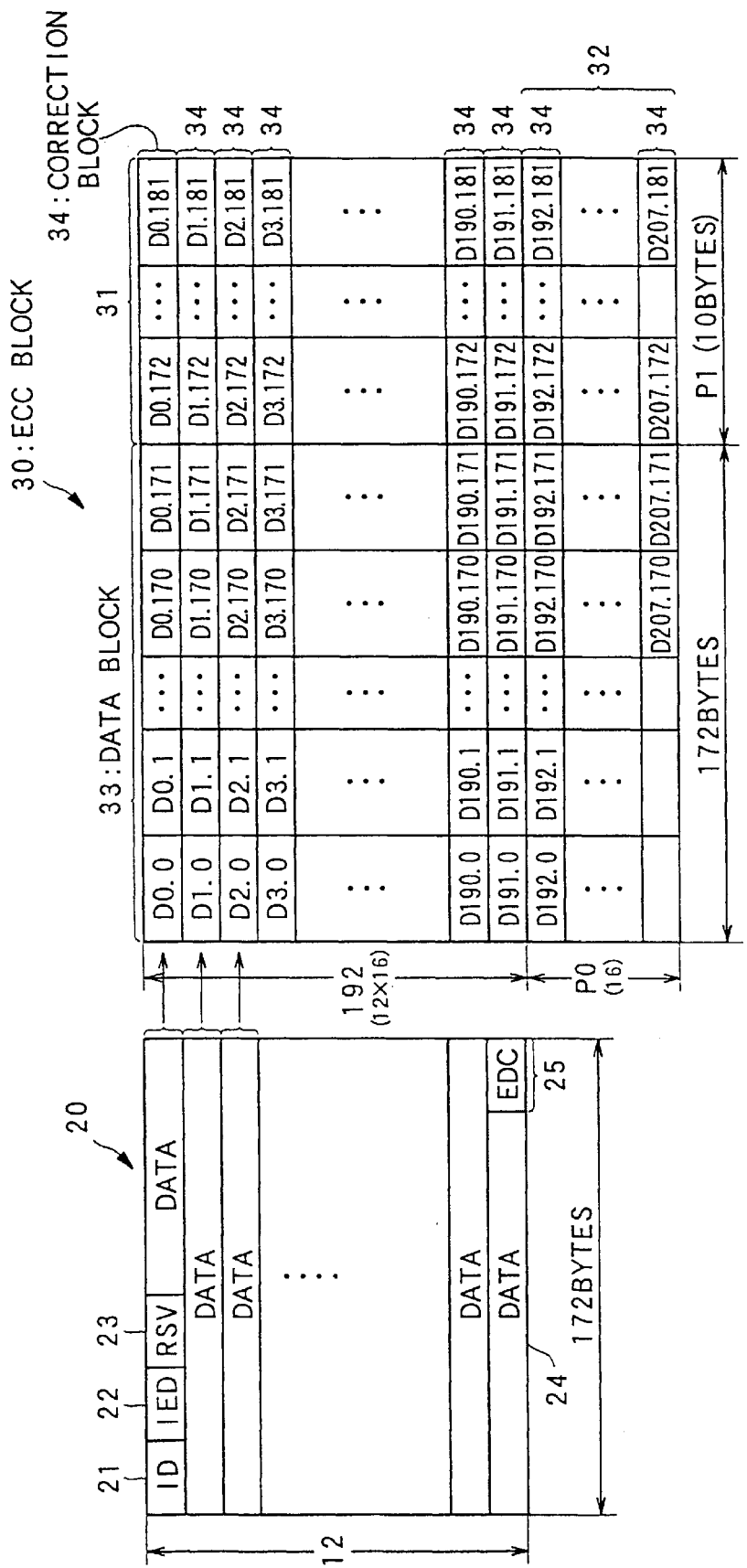
FIG. 2 is a view illustrating the structure of an ECC block that is made up by the use of the data sectors each illustrated in FIG. 1.

FIG. 2 shows the structure of the ECC block. When constructing the ECC block, Initially, one data sector 20 is divided into units of 172 bytes. Then, the thus-divided data (hereinafter referred to as "data blocks 33") are arrayed in lines in the vertical direction, as illustrated on the left side of FIG. 2. By doing so, the 12-line data blocks 33 are arrayed in the vertical direction.

Subsequently, as illustrated on the right side of FIG. 2, 10-byte PI (Parity In) codes 31 are allotted to the data blocks 33, respectively. By the PI code 31 being added to the end of the data block 33, one correction block 34 is made up of. At this stage, the correction blocks 34 that include the PI codes 31 are arrayed in 12 lines in the vertical direction. And, this addition processing of the PI codes 31 is repeatedly executed by the extent corresponding to 16 pieces of the data sectors 20. As a result of this, the correction blocks 34 in 192 lines are obtained.

On the right side of FIG. 2, further, the block data that is formed by the above-described 192-line correction blocks 34 being arrayed in the vertical direction is divided in units of a byte by dividing lines that extend in the vertical direction. And, 16 pieces of PO (Parity Out) codes 32 are added to the divided data. It is to be noted that the PO codes 32 are added also to the PI code 31 portion of the correction blocks 34.

Thus, one ECC block 30 that includes 16 pieces of the data sectors 20 is formed. It is to be noted that as understood from the foregoing description a total amount of information data of the one ECC block 30 is represented by the following expression:

$$(172+10) \text{bytes} \times (192+16) \text{lines} = 37856 \text{ bytes.}$$

Among these bytes, the information data 24 is represented by the following expression 2:

$$2048 \text{ bytes} \times 16 = 32768 \text{ bytes.}$$

Also, on the right side of FIG. 2, the number [#D.*] is allotted to each 1 byte constituting the ECC block 30. For instance, the number [D1. 0] indicates 1-byte data that is located at the position of (1st line, 0th row). The number [D190. 170] indicates 1-byte data that is located at the position of (190th line, 170th row). Accordingly, the PI codes 31 are located in the positional region of from 172nd row to 181st row and the PO codes 32 are located in the positional region of from 192nd line to 207th line.

Further, since one correction block 34 is recorded successively on the DVD-R, there is the possibility that error on this block as a whole will occur. However, as illustrated on the right side of FIG. 2, the ECC block 30 is constructed in such a way as to include both the PI codes 31 and the PO codes 32 and therefore the correction of the data that are arrayed in the horizontal direction on the right side of FIG. 2 can be performed by means of the PI codes 31. And, the correction of the data that are arrayed in the vertical direction on the right side of FIG. 2 can be performed by means of the PO codes 32. As a result of this, in the interior of the ECC block 30 shown on the right side of FIG. 2, it becomes possible to perform duplex error corrections in the horizontal and vertical directions and therefore it is possible to perform more powerful error correction than that in the error correction processing executed on a conventional CD (Compact Disk).

Saying in detail about this respect, for example, even when one correction block 34 (which as stated before includes 182 bytes in all that includes the PI codes 31 corresponding to one line and which is recorded successively into the DVD-R) has all been destroyed due to external damages caused to the DVD-R, if viewing this in the vertical direction, such destruction only means that 1-byte data has been destroyed with regard to the PO codes 32 in one row. Accordingly, if performing error correction by the use of the PO codes 32 in each row even when all data corresponding to one correction block 34 has already been destroyed, performing error correction can accurately reproduce the data.

Figure 3:
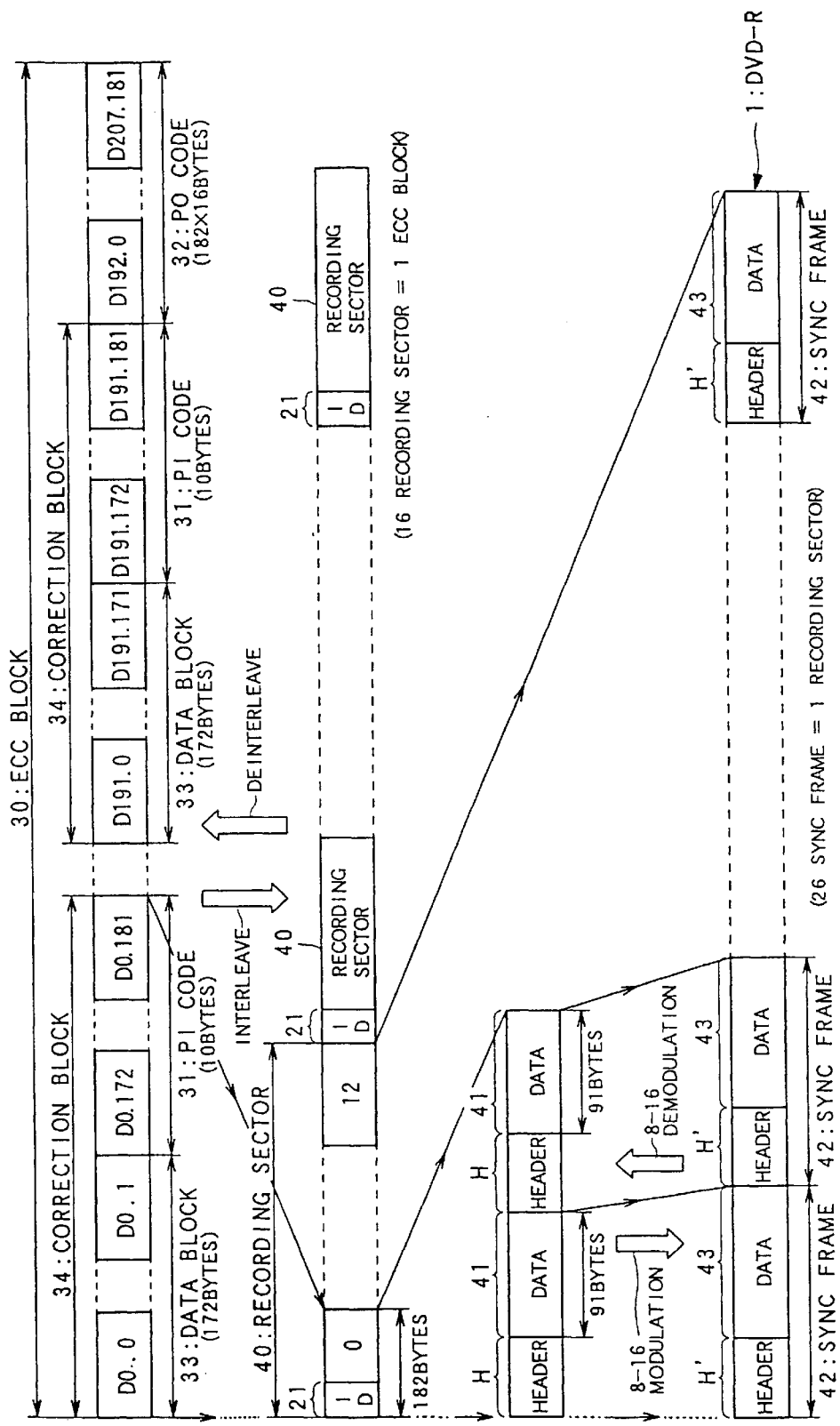
FIG. 3 is a view illustrating a physical format of data that is recorded in the DVD-R.

FIG. 3 shows a conversion of data in the ECC block 30 when it is recorded onto the DVD-R. The uppermost stage of FIG. 3 shows the form of the ECC when the recording of the data is started. The data in the ECC block 30 are arranged in one row in units of a correction block 34 in the horizontal direction. It is to be noted that in FIG. 3 the 1-byte data that has been numbered [D#.*] is the same as the data that has the same number on the right side of FIG. 2.

The data are then interleaved. As a result of this, as shown at the second stage of FIG. 3, the ECC block 30 is converted to 16 pieces of the recording sectors 40. After this conversion, it results that one recording sector 40 contains therein 2366 bytes (37856 bytes ÷16) of information and in this information there co-exist the data sectors 20, PI codes 31 or PO codes 32, provided, however, that the ID information 21 (see FIG. 1) in the data sector 20 is located at the foremost position of each recording sector 40.

As shown at the third stage of FIG. 3, this one recording sector 40 is divided into portions 41, each having 91 byte data and each of which has a header H added thereto. Thereafter, the recording sector 40 having the header added thereto is subjected to 8–16 modulation and, as shown at the lowermost stage of FIG. 3, this recording sector 40 is converted to a sync frame 42 in units of the data 41 and its header. After this conversion, one sync frame 42 is constructed of a header H' and data 43. Also, the amount of information of one sync frame 42 has a value that is represented by the following expression:

91 bytes×8×(16/8)=1456 channel bits (provided, however, that when calculating this amount of information with the sync information being contained therein, the former information amounts to 1488 channel bits).

This sync frame 42 is actually written into the DVD-R in a continuous form. At this time, one recording sector 40 contains 26 pieces of the sync frames 42 therein.

By recording information into the DVD-R in accordance with the above-explained physical format, if in reproducing this information 8–16 demodulation and deinterleave are performed (see FIG. 3), it is possible to restore the ECC block 30 into the original one and, by performing the above-described powerful error correction, to reproduce the information accurately.

Thus, while the information is recorded into the DVD-R in such a form of sync frame sequence as shown at the lowermost stage of FIG. 3, this recording is done, in the DVD-R, into tracks that are predetermined.

Figure 4:
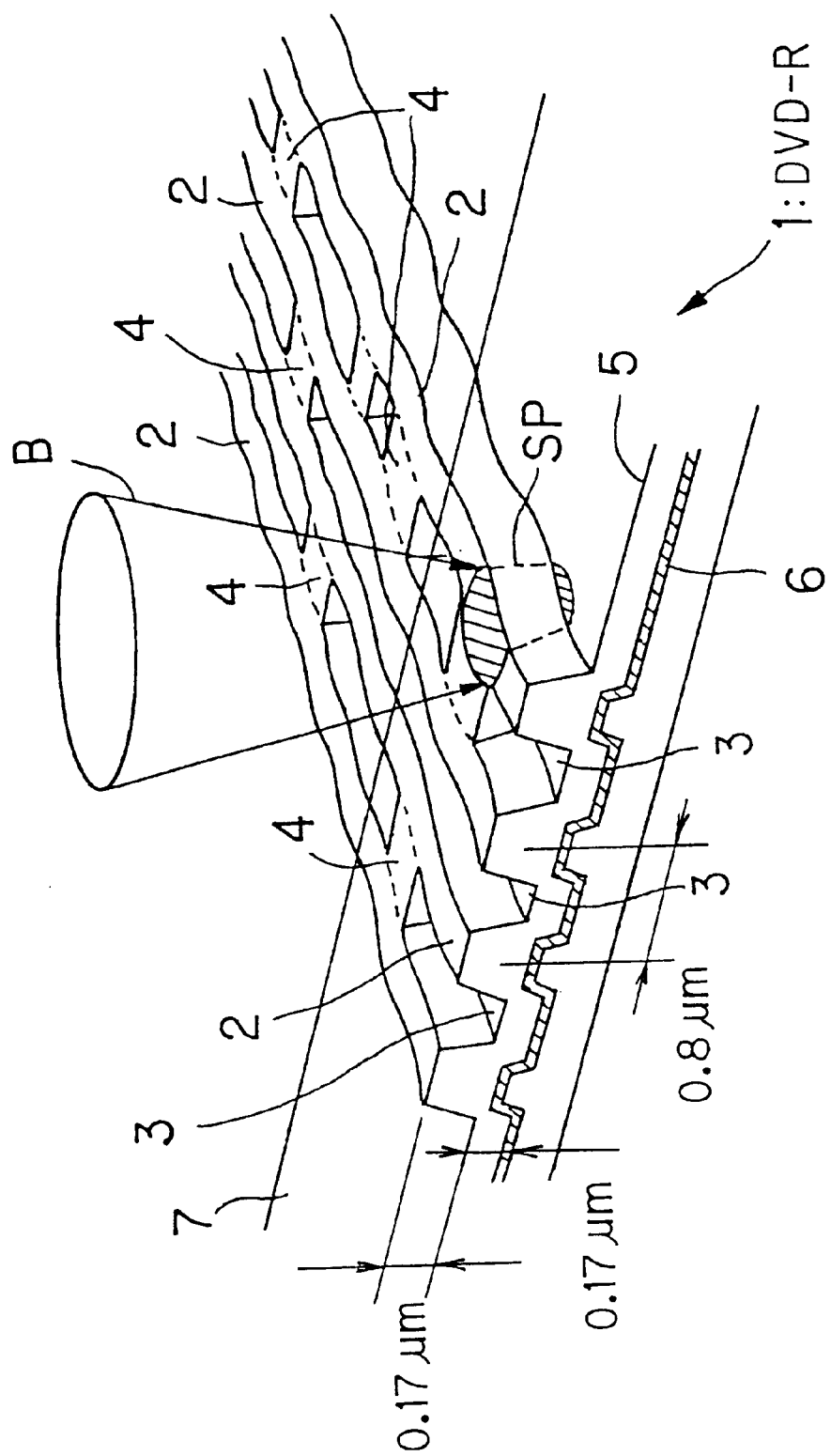
FIG. 4 is a perspective view illustrating the structure of a recording layer of the DVD-R.

FIG. 4 shows the structure of a recording layer of the DVD-R. Recording information is recorded into this recording layer.

In FIG. 4, the DVD-R 1 has formed therein a pigment film 5, in which there are formed groove tracks 2 each enabling information (sync frame sequence) to be written therein and land tracks 3 each located adjacently to the groove track 2 and intended to guide a laser beam B serving as a read light or write (recording) light to this groove track 2. The groove track 2 is made concave when viewed from the side of a source of generation of the laser beam B and the land track 3 is made convex when viewed from this side of the source of generation thereof. The tracks 2 and 3 are so formed as to have carried thereon a gold deposition surface 6 that serves as a light reflecting surface for reflecting the beam B.

The groove track 2 has formed thereon a so-called "wobbling" which wavily undulates at a prescribed frequency (e.g., the frequency corresponding to a proper rotation speed of the DVD-R) in a direction parallel with the flat surface of the DVD-R 1. By using such wobbling, when reading the information, it becomes possible to control the rotation of the DVD-R 1.

The land track 3 has formed therein pre-pits 4 that represent recording control information such as address information indicating the recording position of the DVD-R 1, timing control information for controlling the recording timing, etc.

The groove tracks 2, land tracks 3, wobbling, and pre-pits 4 are formed in the DVD-R 1 beforehand. Saying in addition, the wobbling and the pre-pits 4 are previously recorded information that was already formed (recorded) in the medium before writing initial information onto it.

When recording information onto the DVD-R 1 having the above-described structure, a light beam B is radiated onto the DVD-R 1 so that the center of this light beam B may come into coincidence with the center of the groove track 2. As a result, the pit corresponding to the sync frame sequence is formed in the groove track 2. At this time, the size of a spot SP of the light beam B is set so that part of the spot may be radiated also onto the land track 3 as illustrated in FIG. 4. Also, using the reflected light in part of the light spot SP that has occurred due to the radiation of the light beam B onto the land track 3, the pre-pit 4 is detected by the use of a push-pull method, whereby the previously recorded information that is already formed in the DVD-R 1 beforehand and that is indicated by this pre-pit is procured. Further, using the reflected light in the light spot SP that is formed by the radiation of the light beam B onto the groove track 2, a wobble signal that corresponds to the wobbling of the groove track 2 is detected with the result that the rotation control of the DVD-R 1 based on this wobble signal is performed.

Figure 5:
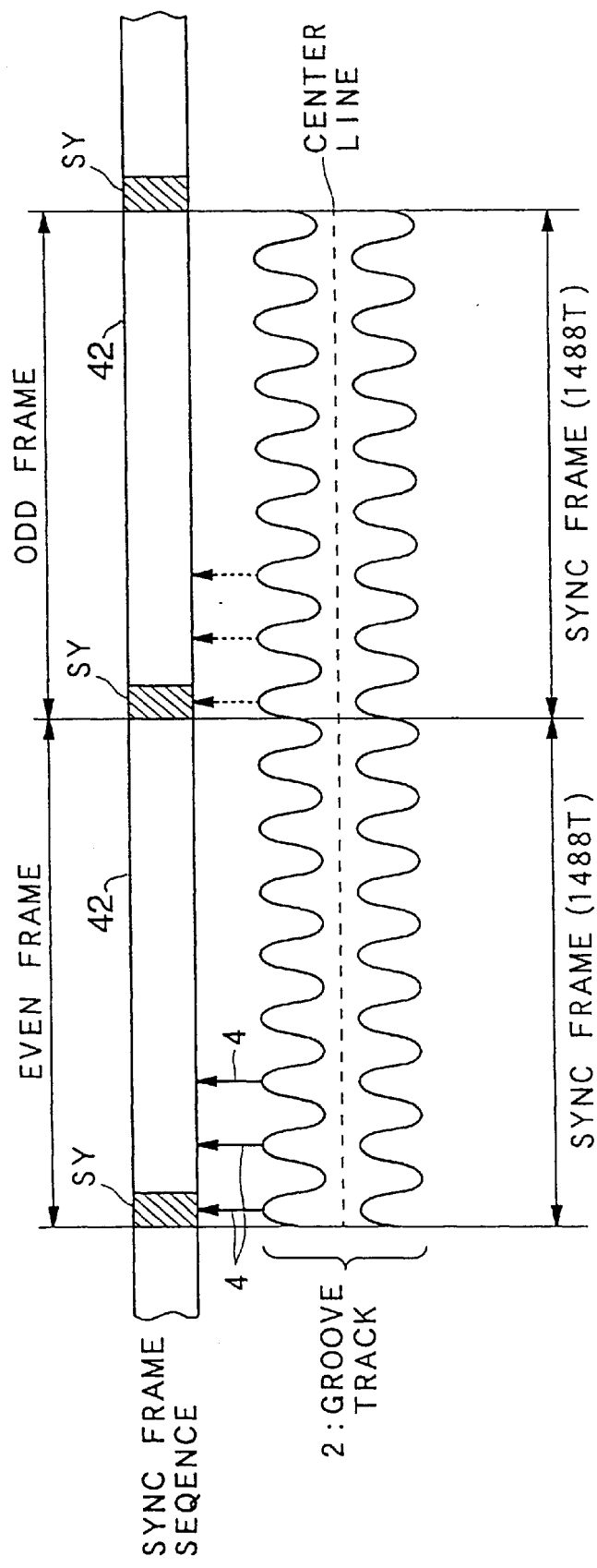
FIG. 5 is a typical view illustrating the correspondence relationship of a groove track in the DVD-R with sync frame sequence data written thereonto and pre-pits formed on land tracks.

FIG. 5 shows a correspondence relationship between the groove track 2 and sequence of the sync frames 42 on the DVD-R 1 and relative locations of the pre-pits formed on the land track 3. The pre-pit formed on the land track 3 is referred to as "an LPP (Land Pre Pit)".

As illustrated in FIG. 5, in the groove track 2 there is recorded along the center line thereof the sequence of the sync frames 42 (sync frame sequence). When performing such recording, control is performed of it so that one sync frame is recorded every 8 wobbling periods, the wobbling period of which is determined by the wobbling that has been formed with respect to the groove track 2. The wobbling has a fixed frequency of 140 kHz (this value is one that has been converted in terms of the proper reading rate) every sync frame 42.

As has been explained previously in connection with FIG. 3, the header H' is allotted to the foremost position of the sync frame 42, and, to this header, a synchronization signal SY is allotted at a forward end thereof. This synchronization signal SY is provided for the purpose of synchronizing the sync frame 42 and has the same waveform symbol, the length of which is 14 T. Here, the "T" corresponds to the between-pit interval in a before-8–16-modulation data sequence such as that illustrated at the third stage of FIG. 3. The sync frame has a length of 1488 T.

On the other hand, the LPP 4 is formed at each of the positions that correspond to the upwardly pointed arrows in FIG. 5. Namely, the LPP 4 is formed at each of the positions that correspond to either the crests or the troughs of the wave that is exhibited in FIG. 5 by the wobbling of the groove track 2, and in addition on the portions of the land track 3 that are adjacent to three crests or troughs as counted from the foremost one in the sync frame. But, in one recording sector (see FIG. 3), it is arranged that the LPP 4 is formed only in each of even sync frames or odd sync frames. In FIG. 5, illustration is made of a case where the LPP 4 has been formed only in each of even sync frames, and no LPP 4 is formed at the positions that correspond to the upwardly pointed dotted lines arrows. The LPP 4 that is disposed at the position nearest to the forward end of the sync frame is provided for the purpose of establishing a synchronization, and this LPP 4 is necessarily disposed in correspondence with each predetermined one of an even or odd number of sync frames. This synchronization LPP 4 has also a function of representing address information on the recording surface of the DVD-R. As a result of this, it becomes possible to discriminate address information in units of a recording sector.

In this embodiment, control is so made that the recording position of the synchronization signal SY in the sync frame data written into the groove track 2 may have a predetermined relationship with the formation position of the LPP 4, as illustrated in FIG. 5, through the operation of a phase adjusting circuit 80 as later described.

Figure 6:
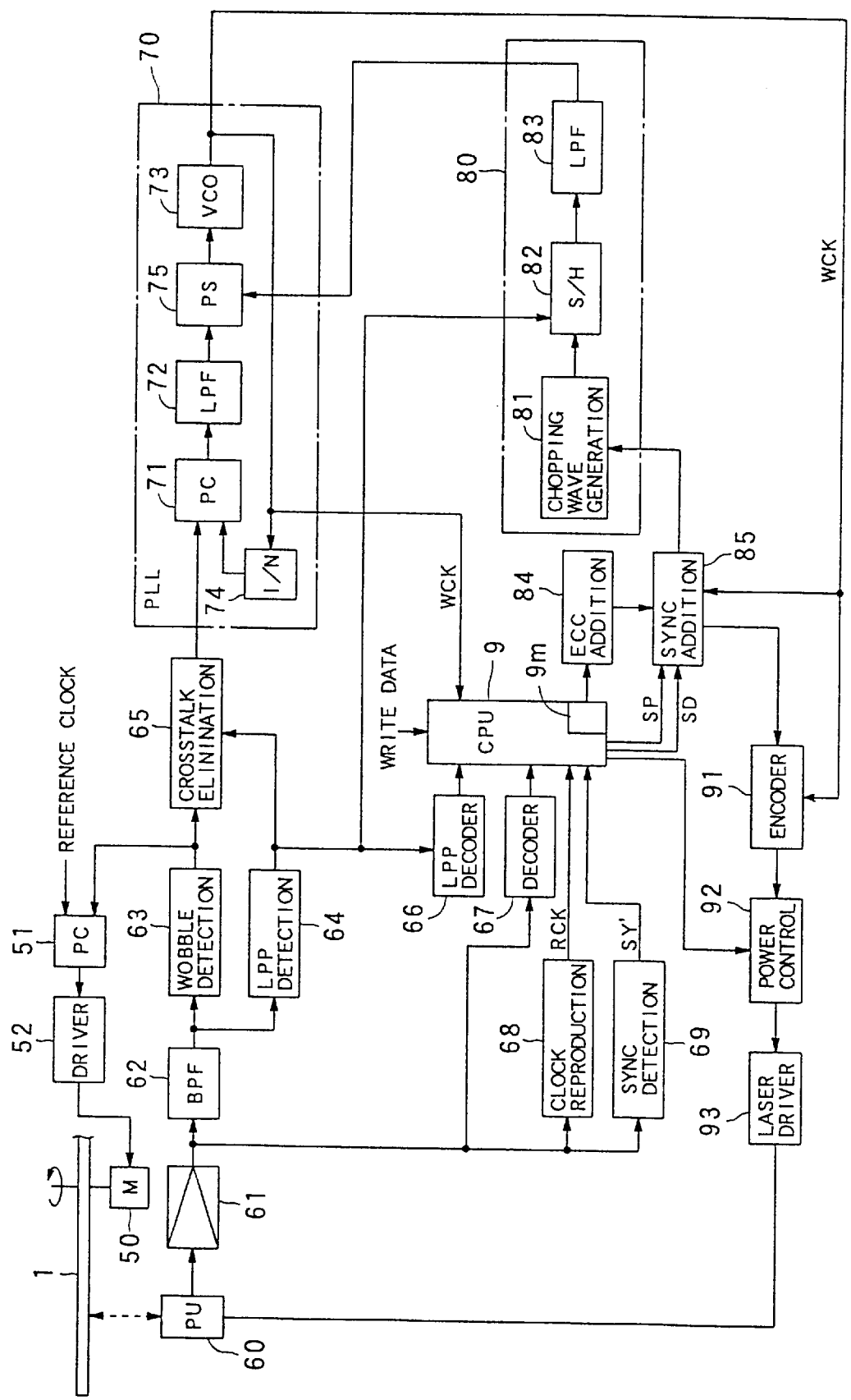
FIG. 6 is a block diagram illustrating a schematic construction of an information recording apparatus according to an embodiment of the present invention.

FIG. 6 is a view illustrating a schematic construction of the information recording apparatus for recording information into the DVD-R 1.

In FIG. 6, a spindle motor 50 causes the rotation of the DVD-R1 (hereinafter referred to simply as "a disk"), and a pick-up 60 radiates a laser light onto the disk that is in rotation. The laser light incident upon the disk is reflected by the reflection surface (see FIG. 4) of the disk and returns to the pick-up 60. This reflected light has its state changed in correspondence with the recorded information that has been recorded in the disk.

The pick-up 60 has built therein a circuit for selectively radiating either a laser light having a level of read light or a laser light having a level of write light and a photoelectric conversion circuit including a light receiving element. The pick-up 60 receives the reflected light that has been reflected from the disk and performs photoelectric conversion in correspondence with the level and state of this light received thereby. The pick-up 60 supplies a signal that has been obtained as a result of this photoelectric conversion, to an amplifier 61 as a reading signal.

The amplifier 61 amplifies the read signal that has been supplied thereto and supplies the thus-amplified read signal to a wobble detecting circuit 63 and an LPP (pre-pit) detecting circuit 64 through a band pass filter (BPF) 62.

The wobble detecting circuit 63 detects or extracts a wobble signal corresponding to the wobbling from the read signal and supplies it to a first input terminal of a crosstalk eliminating circuit 65. The wobble signal is a signal that has a frequency component substantially corresponding to the wobble frequency.

The LPP detecting circuit 64 detects the pre-pit 4 from the read signal and produces a pre-pit signal corresponding to the detected result. The pre-pit signal is supplied to a second input terminal of the crosstalk eliminating circuit 65 and is also supplied to a pre-pit (LPP) decoder 66.

The crosstalk eliminating circuit 65 eliminates the jitter component resulting from the crosstalk contained in the wobble signal, on the basis of the pre-pit signal, and supplies the wobble signal that has been obtained after this elimination has been made, to a wobble synchronization clock producing PLL circuit 70. The wobble signal thus obtained has a precision that depends upon the detection precision of the pre-pit signal based on the residual errors that could not be eliminated sufficiently if through a time axis servo control such as a servo control performed on a time axis or a servo control performed based on a spindle. In other words, the wobble signal obtained as mentioned above contains an error (±5 T or so) that is made in the pre-pit signal due to the residual errors.

The PLL circuit 70 is comprised of a phase comparing circuit (PC) 71, a low pass filter (LPF) 72, a phase shifter (PS) 75, a VCO 73, and a divider 74. The phase comparing circuit 71 performs phase comparison between the wobble signal having had its crosstalk eliminated and a signal output from the divider 74 and thereby outputs an error signal that corresponds to the phase difference therebetween. The low pass filter 72 permits the passage of only low frequency components of the error signal. The phase shifter 75 has variable capacitor and produces DC components of the error signal according to a phase adjusting signal sent from a phase adjusting circuit 80 as later described. Further, by applying these DC components to the variable capacitor, the phase shifter 75 causes a change in the electrostatic capacitance of the variable capacitor and thereby causes a shift of the voltage of the DC components. The VCO 73 outputs a clock signal whose frequency changes according to the signal supplied from the phase shifter 75. The divider 74 performs frequency dividing of the clock signal that is output from the VCO 73 to thereby produce a signal whose frequency is the same as that of the wobble signal, and supplies this signal to the phase comparing circuit 71.

The clock signal that is output from the VCO 73 is used as a write clock signal WCK. In this way, the write clock signal WCK has its phase synchronized with the phase of the wobble signal by the PLL circuit 70 and is supplied to an encoder 91 and a sync adding circuit 84 as later described.

The read signal that has been amplified from the amplifier 61 is also supplied to a main data decoder 67, a pit clock reproducing circuit 68, and the sync detecting circuit 69.

The information recording apparatus performs not only the recording operation but also a reproducing operation. In the reproducing operation, the main data decoder 67 performs 8–16 demodulation, deinterleave, and error correction processing based on the use of the ECC block, with respect to the read signal to thereby restore the data 24 (see FIGS. 1 to 3). The thus-restored data is transferred to a CPU 9. The CPU 9 sends this restored data to a reproduction data processing system not illustrated that is used for the purpose of delivering an actual acoustic output, video output or data output.

On the other hand, the LPP 66 detects from the detected pre-pit signal the address information representing the recording position of relevant data in the recording surface of the disk and the sync frame synchronization information and sends these pieces of information to the CPU 9. The CPU 9 performs various kinds of processing by the use of the address and the sync frame synchronization information that have been obtained based on the pre-pit signal.

The clock reproduction circuit 68 reproduces a pit synchronization clock signal (having a period of T) regarding the read signal. This processing is performed by detecting the synchronization signal SY (see FIG. 5) contained in the read signal. The output of the clock reproduction circuit 68 is supplied as a reproduction clock signal RCK to the CPU 9.

The sync detecting circuit 69 detects the synchronization signal SY contained in the read signal and generates, for example, a pulse-shaped sync detection signal SY' in response to this detection. The sync detection signal SY' is supplied to the CPU 9.

The ECC adding circuit 84 adds the above-described PI codes 31 and PO codes 32 to an original signal representing the data to be written in, thereby making up the ECC block 30, and simultaneously performs interleave processing on this ECC block 30. The original signal representing the data to be written in is stored once into a built-in memory 9 m of the CPU 9 from a write data supply system not illustrated and then is sequentially read out with a prescribed timing that has been determined by the CPU 9 and is transferred to the ECC adding circuit 84.

The sync adding circuit 85 performs counting in synchronism with the write clock signal. The sync adding circuit 85 is equipped with a counter that starts its operation by using as a trigger signal the sync frame signal SD which is output from the CPU 9 according to the output signal from the LPP decoder 66. The sync adding circuit 85 produces a write synchronization signal SY having a length of 14 T in units of a prescribed period and outputs it to an encoder 91. Also, the sync adding circuit 85 is equipped with a buffer. The interleaved data that is output from the ECC adding circuit 84 is stored once into the buffer and is transferred to the encoder 91 in synchronism with the write clock signal WCK. Since the transfer of the data from within the buffer is made after the write synchronization signal SY has been output, the data supplied to the encoder 91 is data in 91-byte units to which the synchronization signal SY has been added as the header H as shown at the third stage of FIG. 3. Also, the sync adding circuit 85 has provided therein an output path of outputting the synchronization signal SY used with respect to a chopping wave generating circuit 81 as later described of the phase adjusting circuit 80. From this output path, after the sync frame signal SD as a trigger signal has been input, the synchronization signal SY is output regardless of whether or not the write operation is being performed. And upon output from the CPU 9 of a write starting pulse signal SP indicating the start of the write operation, using this write starting pulse signal SP as a trigger signal, the sync adding circuit 85 outputs, the write synchronization signal SY and the data in 91-byte units to the encoder 91.

The encoder 91 performs final encoding of the data to be written onto the disk that has been output from the sync adding circuit 85. Here, conversion of code for performing such an 8–16 modulation as is referred to previously in FIG. 3 is performed. The data that has finally been encoded by the encoder 91 is sent to a power control circuit 92.

The power control circuit 92, in write mode, generates a control signal for designating a laser power that corresponds to the coded data that has been sent thereto from the encoder 91. A laser driving circuit 93 generates a driving signal whose level changes in correspondence with this control signal. As a result of this, the strength of a recording (writing) laser light that is radiated onto the disk by the pick-up 60 changes in correspondence with the coded data. On the other hand, in read mode, the power control circuit 92 generates a control signal for designating a reading laser power low and substantially constant in level without responding to the coded data that has been sent thereto from the encoder 91. And the laser driving circuit 93 generates a driving signal having a substantially constant level corresponding to this control signal. As a result of this, the strength of a reproduction (read) laser light radiated onto the disk by the pick-up 60 is relatively low and substantially constant.

The wobble signal that is output from the wobble detecting circuit 63 is used also for performing the rotation control of the disk. Particularly, the wobble signal is supplied to one input terminal of a phase comparator 51 whose other input terminal has supplied thereto a reference clock signal from a local oscillator not illustrated. The phase comparator 51 obtains a frequency error and a phase error between these two input signals and supplies to a driver circuit 52 a spindle control signal that corresponds to such errors. The driver circuit 52 generates a driving signal for driving a motor 50 that corresponds to this spindle control signal. As a result of this, the rotation of the motor 50 is controlled so that the frequency of the wobble signal detected from the read signal may coincide with the frequency of the reference clock signal.

The phase adjusting circuit 80 is comprised of a chopping wave generating circuit 81 for producing a chopping wave signal from the falling edge of the write synchronization signal SY that is output from the sync adding circuit 85, a sample/hold (S/H) circuit 82 samples and holds this chopping wave signal with an output timing at which the LPP signal is output, and a low pass filter (LPF) 83 which extracts DC components from the output of the sample/hold circuit 82 and thereafter outputs the DC components to the variable capacitor of the phase shifter 75 of the above-described PLL circuit.

In a case where the write synchronization signal SY produced in synchronism with the write clock signal WCK and the LPP signal get out of position in terms of phase and as a result the center of the synchronization signal SY is out of coincidence with the output timing of the LPP signal, the voltage corresponding to this phase difference is supplied to the variable capacitor of the phase shifter 75 of the PLL circuit 70. As a result of this, the phase of the write clock signal WCK has its phase adjusted so that the center of the synchronization SY may coincide with the output timing of the LPP signal.

The information recording apparatus stores new data onto the disk having had data already written therein so as to add the former new data to the latter data. Hereinafter, data that has been already written in the disk is referred to as "old data" and data that is newly added to the disk is referred to as "new data". On the disk, new data is recorded immediately after the position at which old data has been recorded. Namely, new data is recorded successively to old data.

The recording operation of the above-described information recording apparatus will hereafter be described.

Figure 7:
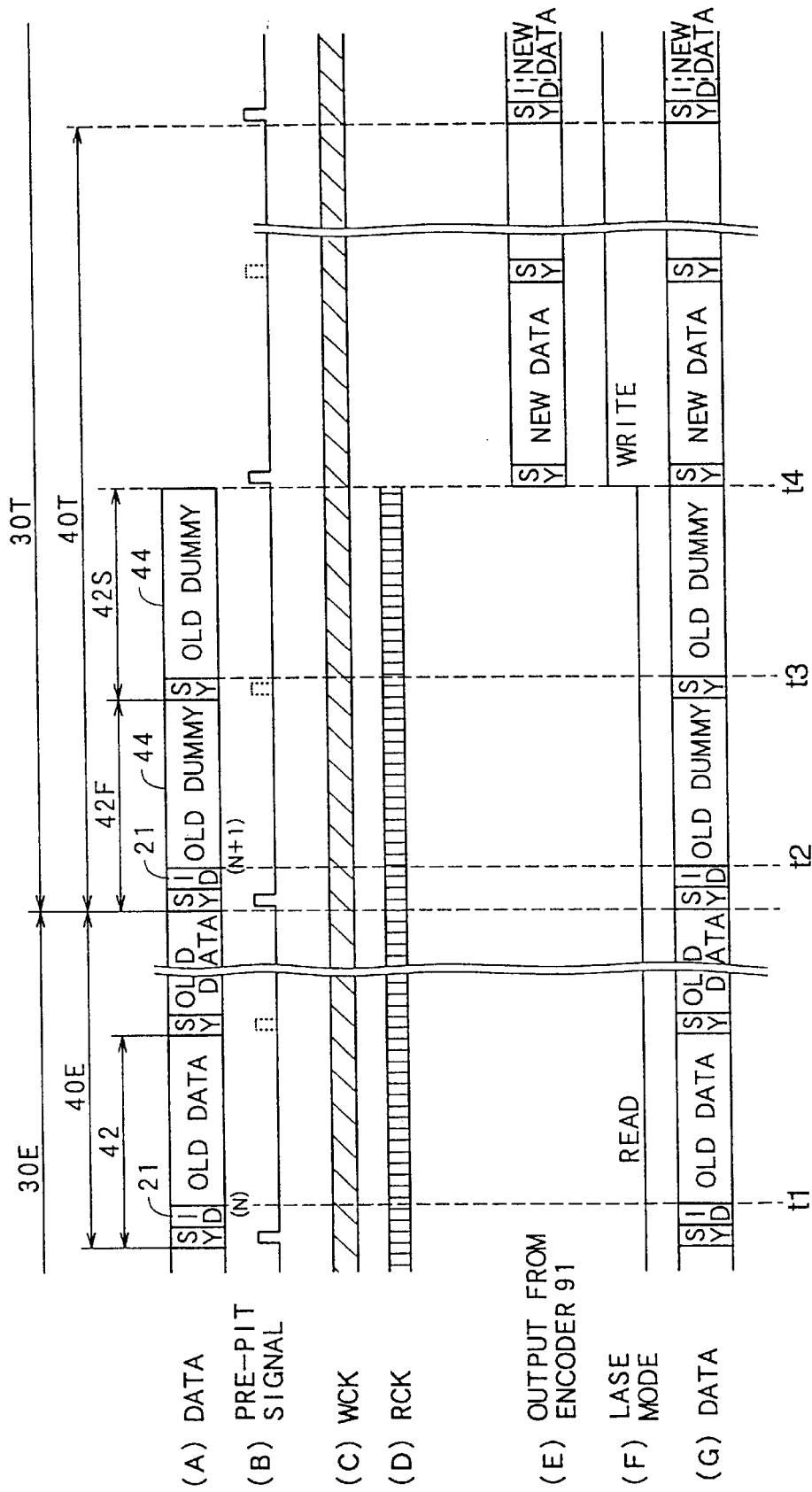
FIG. 7 is a time chart illustrating operational waveforms and their operational formats at respective parts of the information recording apparatus of FIG. 6.

FIG. 7 is a time chart illustrating signal waveforms and their operation forms of signals which during the recording operation of the information recording apparatus are produced in and from the respective circuits of the information recording apparatus.

First, when having finished write of old data, as illustrated at the (A) stage of FIG. 7, the information recording apparatus successively records dummy data 44 (hereinafter referred to as "old dummy data 44"), synchronization information SY, and its corresponding ID information 21 at the position after the end of the old data. This dummy data 44 is dummy data that corresponds to the entire data portion that includes the first sync frame 42F and second sync frame 42S in a foremost recording sector 40T of the ECC block 30T to be disposed next to the last ECC block 30E of the old data.

Upon generation of an additional-record starting instruction from instruction means not illustrated, the information recording apparatus starts performing the recording operation for additionally recording new data onto the disk having had the old data and old dummy data 44 already recorded thereon.

Figure 8:
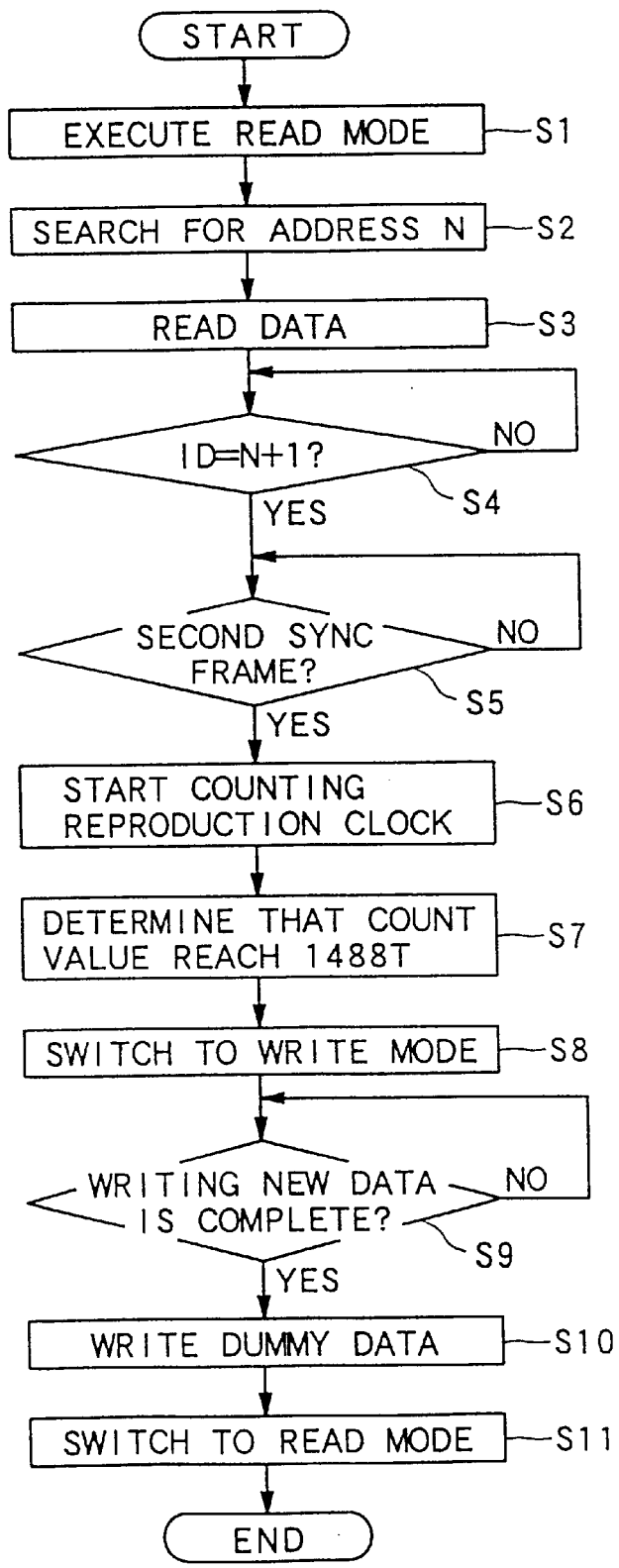
FIG. 8 is a flow chart illustrating the procedural steps of an additional recording process that is executed by a CPU of the information apparatus of FIG. 6.

This recording operation is executed mainly by the CPU 9. FIG. 8 is a flow chart illustrating the recording operation.

In FIG. 8, the CPU 9 first executes a read mode in response to the additional-record starting instruction (step S1). The term "read mode" means a mode in which there is mainly performed an operation of reading the old data or old dummy data 44 that has been recorded in the disk. In this read mode, the CPU 9 controls the power control circuit 92 without responding to the input data thereto from the encoder 91 so that the strength of the radiation light of the pick-up 60 with respect to the disk 1 may come to have a level relatively low and constant that does not cause the occurrence of a write action on the recording surface thereof.

Subsequently, in order to search for a forward side ID information 21 of the recording sector 40E having recorded therein the last one of the old data, the CPU 9 searches for an address (N address) that corresponds to the ID information 21 (step S2). This processing is executed according to the output signal from the decoder 67.

It is to be noted that it is assumed that the address represented by the ID information 21 located on a foremost side of the data in the last recording sector 40E in the last ECC block 30E is N address and the address represented by the ID information 21 located on a foremost side of the recording sector 40T in which the old dummy data 44 is recorded subsequently thereto is (N+1) address.

When the ID information 21 corresponding to the N address is detected (the time t1 in FIG. 7), the CPU 9 starts to read the data that is recorded in the recording sector 40E subsequently to the ID information 21 corresponding to the N address and the data in its immediately succeeding recording sector 40T (step S3).

Then, the CPU 9 determines, according to the demodulation output of the thus-read data, i.e., the output signal from the decoder 67, whether or not the ID information 21 corresponding to the (N+1) address has been detected (step S4). In step S4, when the ID information 21 corresponding to the (N+1) address is not detected, the CPU 9 continues to read the data until this information 21 is detected.

In step S4, when the ID information 21 corresponding to the (N+1) address has been detected (see the time t2 in FIG. 7), the CPU 9 next searches for the second sync frame 42S in the recording sector 40T corresponding to the ID information 21 at the (N+1) address (step S5). In greater detail, the CPU 9 receives from the sync detecting circuit 69 the detection signal SY' representing the head of the second sync frame 42S and, with this reception timing, recognizes the incoming of the second sync frame 42S.

When the second sync frame 42S is detected (see the time t3 in FIG. 7), the CPU 9 starts to count the reproduction clock signal RCK from the clock reproduction circuit 68 (step S6).

Then, the CPU 9 determines whether this count value has reached 1488 T corresponding to one sync frame (step S7). When the count value has reached 1488 T, the CPU 9 outputs the write starting pulse SP to the sync adding circuit 85 (see the time t4 in FIG. 7) and also switches the read mode to the write mode (step S8).

In the write mode, the CPU 9 controls the power control circuit 92 in correspondence with the input data from the encoder 91 so that the level of the laser light with respect to the disk may be changed between the write light level and the read light level.

As a result of this, among the output data from the encoder 91, the data in the third sync frame and its immediately succeeding sync frames, such as that illustrated at the (E) stage in FIG. 7, is taken into the power control circuit 92 and is recorded onto the disk 1.

Also, when the write starting pulse SP is output to the sync adding circuit 85, the write synchronization signal SY and data (91 bytes) are transferred from the sync adding circuit 85 to the encoder 91 in synchronism with the write clock signal WCK. Thereafter, the encoder 91 performs the 8–16 modulation processing thereon in synchronism with the write clock signal WCK and transfers the post-modulation data to the power control circuit 92.

At this time, the write clock signal WCK that is used in the sync adding circuit 85 and the encoder 91 is the signal that has been synchronized by the PLL circuit 70 with respect to the wobble signal having had its crosstalk eliminated by the crosstalk eliminating circuit 65, and further, this write clock signal is the signal that has had its phase adjusted by the phase adjusting circuit 80 so that the center (the position of T/2 that is taken when the pulse width is assumed to be T) of the synchronization signal SY may coincide with the center (the position of T'/2 that is taken when the pulse width is assumed to be T') of the LPP signal. Therefore, the synchronization signal SY of the new data is accurately recorded at the additionally recorded position (the position indicated by the timing of the time t4 in FIG. 7).

Figure 9:
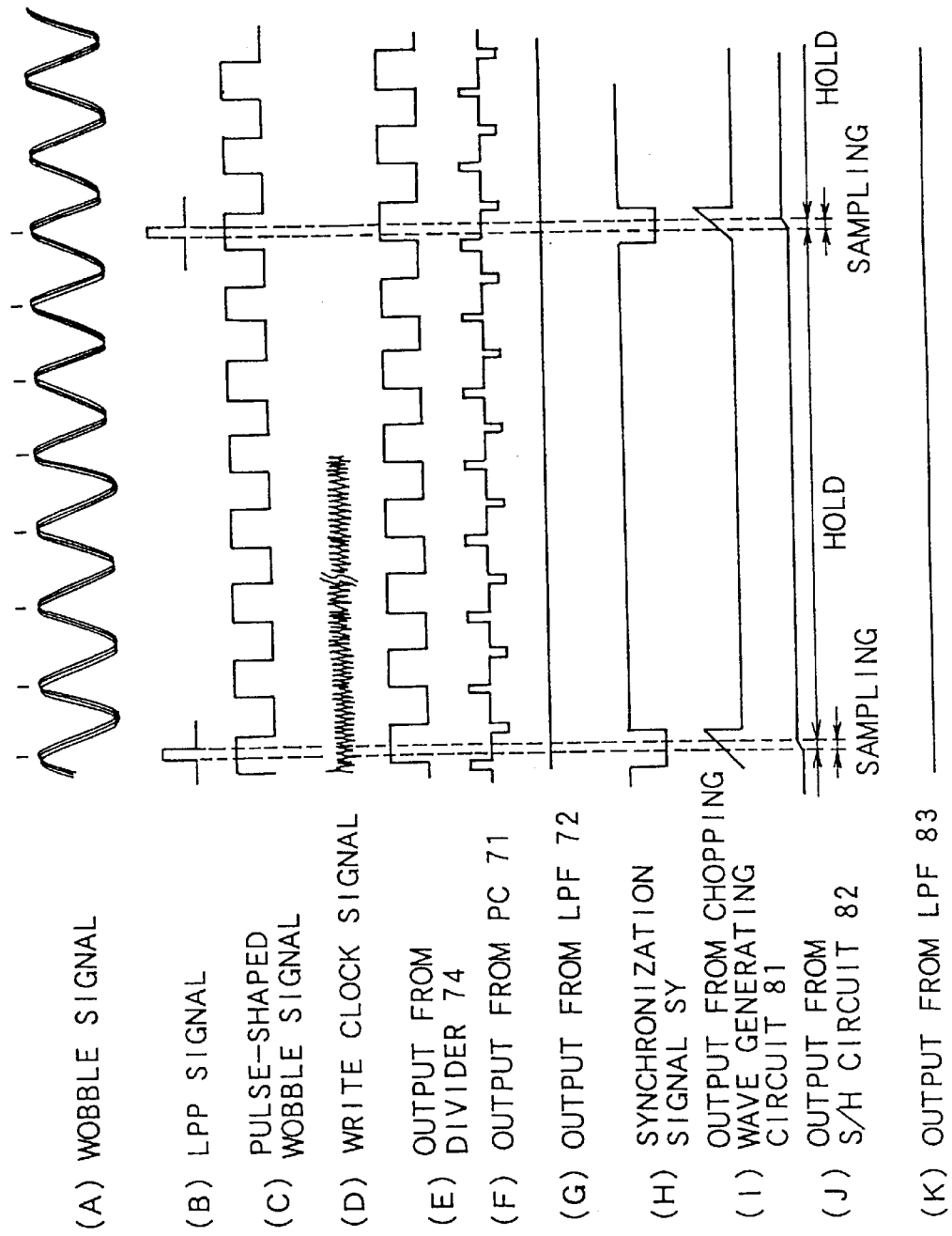
FIG. 9 is a time chart illustrating the operations of a PLL circuit and a phase adjusting circuit in the information recording apparatus of FIG. 6.

Here, the operation of the circuit that performs phase adjustment of the write clock signal WCK in the above-described way will be explained in detail according to the block diagram of FIG. 6 and time chart of FIG. 9.

First, the wobble signal that is a signal becoming a reference for the write clock signal WCK is detected by the wobble detecting circuit 63 as illustrated in FIG. 6. However, the wobble signal that has been detected by the wobble detecting circuit 63 is a signal having jitters resulting from the crosstalk as illustrated in FIG. 9(A). On this account, in this embodiment, such crosstalk is eliminated by the crosstalk eliminating circuit 65.

Figure 11:
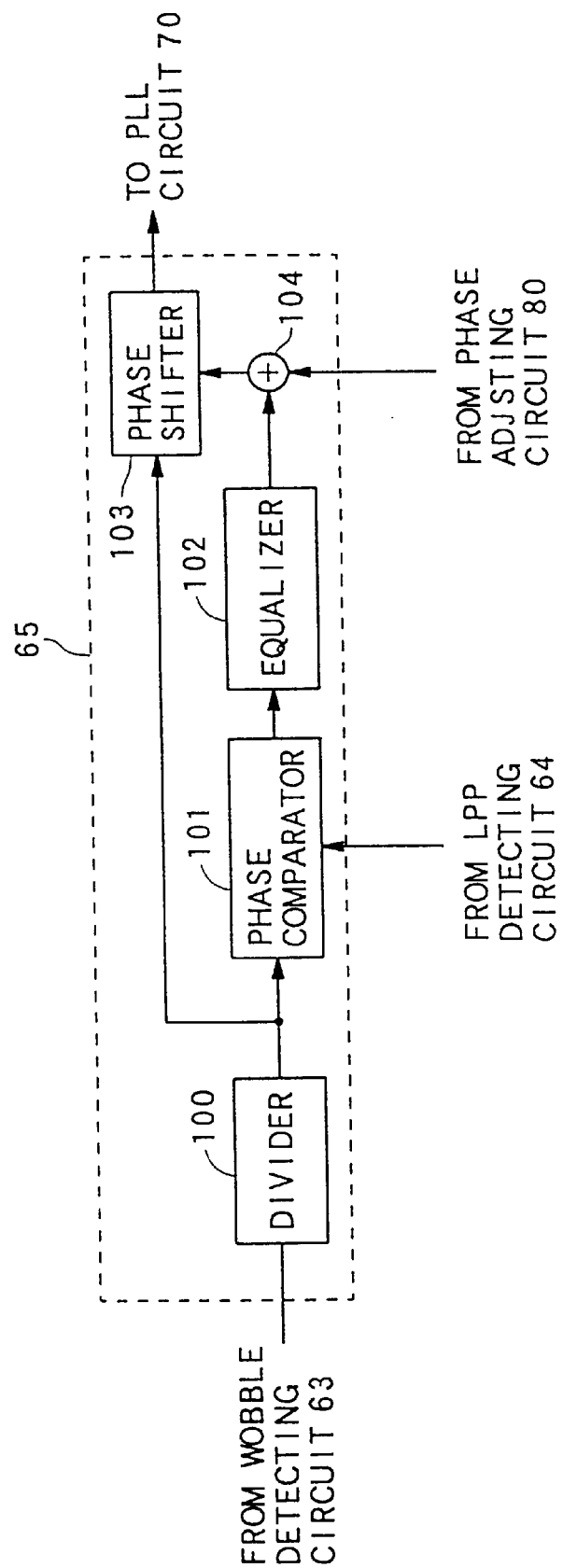
FIG. 11 is a block diagram illustrating another embodiment of the phase adjusting part of the information recording apparatus according to the present invention.

As illustrated in FIG. 11, this crosstalk eliminating circuit 65 is comprised of a divider 100 for performing frequency dividing of the wobble signal having jitters, a phase comparator 101 for comparing the phase of the frequency-divided wobble signal and that of the LPP signal, an equalizer 102 for smoothing the output signal of the phase comparator 101, and a phase shifter 103 for shifting the phase of the frequency-divided wobble signal in correspondence with the output signal from the equalizer 102.

When performing frequency dividing of the wobble signal having a jitter such as that illustrated in FIG. 9(A) through the operation of the divider 100, the wobble signal is converted into a signal having a pulse-shaped waveform. And this signal is input to the phase comparator 101. The phase comparator 101 compares the phase of the wobble signal that has been converted into the pulse-shaped waveform signal and the phase of the LPP signal. Where the phase relationship between the both signals is kept in such a form as in the phase relationship between the groove track 2 and the LPP 4 that is illustrated in FIG. 5, namely where the LPP signal is located at the center position of the "High" period in which the pulse-shaped wobble signal is high, the phase comparator 101 does not cause a change in voltage value of the output signal therefrom. Where the LPP signal is not located at the center position of the "High" period in which the pulse-shaped wobble signal is high, the phase comparator 101 causes a change in voltage value of the output signal therefrom in correspondence with the largeness of the positional displacement. This change in voltage value of the output signal is smoothed by the equalizer 102. This output signal is then supplied to the phase shifter 103. The phase shifter 103 changes the phase of the pulse-shaped wobble signal in correspondence with the output voltage signal from the equalizer 102. As a result, the phase of the wobble signal is adjusted so that the LPP signal may be located at the center position of the "High" period of the wobble signal as illustrated in FIG. 9(C). And this wobble signal is output from the crosstalk eliminating circuit 65 to the PLL circuit 70.

To the PLL circuit 70 there is inputted the wobble signal whose jitters resulting from the crosstalk have been thereby eliminated and whose phase has been thus regularly ordered with respect to the LPP signal. In the PLL circuit 70, phase comparison is made between such wobble signal and the signal obtained by frequency dividing, by the divider 74, the output signal from the write clock generating circuit (VCO) 73, through the operation of the phase comparing circuit (PC) 71. In FIG. 9(E) illustration is made of an example of the output signal from the divider 74 and, in FIG. 9(F), illustration is made of an example of the output signal from the phase comparing circuit 71. The output of the phase comparing circuit 71 is extracted as a DC component by the LPF 72 as illustrated in FIG. 9(G). This DC component is supplied to the write clock generating circuit 73 through the phase shifter 75, whereby the phase difference between the wobble signal and the divided-by-N write clock signal is adjusted to a prescribed reference value. The write clock signal WCK that is output from the write clock generating circuit 73 becomes a signal that has been synchronized, through the operation of such PLL circuit 70, with the wobble signal having had its jitters resulting from the crosstalk eliminated as illustrated in FIG. 9(D). And that signal is supplied to the sync adding circuit 85 or encoder 91. Accordingly, regardless of whether writing old data or new data, it is possible to perform the writing operation by the use of the write clock signal WCK whose frequency is always constant.

In this embodiment, further, in order to make substantially fixed the interval between the write synchronization signal SY synchronized with the write clock signal WCK and the LPP signal, the phase shifter 75 is provided within the PLL circuit 70 and it has been arranged that the phase shifter 75 is controlled by the phase adjusting circuit 80.

In the phase adjusting circuit 80, the write synchronization signal SY that is output from the sync adding circuit 85 as illustrated in FIG. 9(H) is supplied to the chopping wave generating circuit 81. In the chopping wave generating circuit 81, a chopping wave signal such as that illustrated in FIG. 9(I) is output in synchronism with the falling edge of the synchronization signal SY. This chopping wave signal is supplied to the sample/hold circuit 82 where the signal is sampled during a time period corresponding to the pulse width of the LPP signal output from the LPP detecting circuit 64 as illustrated in FIG. 9(J), and the voltage of the signal having been sampled during this time period is held. And the voltage thus held is converted into a DC component by the LPF 83 as illustrated in FIG. 9(K) and the resulting signal is supplied to the variable capacitor of the phase shifter 75 provided at the preceding stage to the write clock signal generating circuit 73 of the PLL circuit 70.

Figure 10:
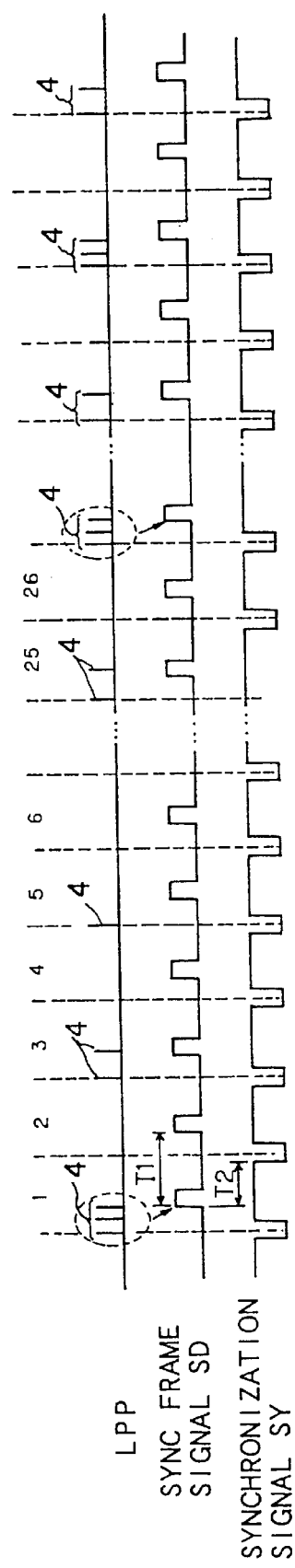
FIG. 10 is a time chart illustrating the relationship among the pre-pits of a recording medium that is used in the information recording apparatus of FIG. 6, a detected sync frame signal that is produced within the information recording apparatus, and a synchronization signal that is so produced.

The synchronization signal SY is a signal which, in the sync adding circuit 85, is output from the counter thereof in units of a prescribed period by using as a trigger the sync frame signal SD output from the CPU 9. Also, the sync frame signal SD that becomes a trigger is a signal that has been output as a pulse signal from the CPU 9 that has been so converted by the CPU 9 from the sync frame synchronization information based on the LPP signal that has been detected by the LPP decoder 66. Namely, upon reception of the sync frame synchronization information from the LPP decoder 66, the CPU 9 counts the write clock signal WCK by using this information as a trigger signal and outputs the sync frame signal SD in units of a fixed period of T1 (FIG. 10). Using the sync frame signal SD as a trigger, the sync adding circuit 85 counts the write clock signal WCK and outputs the synchronization signal SY in units of a fixed period of T2. Accordingly, between each of the LPP 4, detection sync signal SD, and synchronization signal SY, there exists such a relationship as illustrated in FIG. 10. Especially, the count value in the sync adding circuit 85 is so set that the LPP signal may be located at the center of the pulse of the synchronization signal SY. Accordingly, where the phase of the write clock signal is not displaced, the LPP signal is located at the center of the synchronization signal SY and the output of the sample/hold circuit 82 has an intermediate value corresponding to the peak-to-peak voltage of the chopping wave signal. On this account, in this embodiment, where, with this intermediate value being used as a reference value, the output voltage from the LPF 83 corresponding to this reference value has been supplied to the variable capacitor in the phase shifter 75 in the PLL circuit 70, no change occurs in the phase of the write clock signal. However, where the phase of the write clock signal has been advanced for some reason or other, the output of the sample/hold circuit 82 becomes smaller than the reference value and therefore the voltage smaller than the reference voltage is supplied to the variable capacitor. Therefore, the electrostatic capacitance of the variable capacitor increases to cause a delay of the phase of the write clock signal. Conversely, where the phase of the write clock signal has been delayed, the output of the sample/hold circuit 82 becomes larger than the reference value, with the result that the voltage higher than the reference voltage is supplied to the variable capacitor, with the result that the electrostatic capacitance of the variable capacitor increases. As a result, the phase of the write clock signal WCK is advanced. In this way, the synchronization signal SY is output from the sync adding circuit 85 so as to be located always at a fixed position with respect to the LPP signal and is written into the recording medium. Therefore, the synchronization signal SY is written accurately into the position indicated by the time t4 in FIG. 7, which is the position at which new data is to be additionally written. Also, since the synchronization signal SY is written with regard not only to the new data but also to old data, the interval of the synchronization signal between adjacent two of the sync frames is always made to have a fixed value throughout the data area including an old data area, new data area, and portion of connection between the old data area and the new data area. And, as a result, even a player whose ability of detecting the synchronization signal is low in level can excellently reproduce without being followed by a failure of detection or an erroneous detection.

Also, making the position of the synchronization signal SY fixed with respect to the LPP signal means making the phase of the write clock signal always fixed with respect to the phase of the LPP signal. Therefore, in both the old data area and the new data area, the phase of the write clock signal is regularly ordered and in addition is made to have the same frequency by the above-described PLL circuit 70. And therefore, this write clock signal does not erroneously operate the PLL circuit 70 used to reproduce the reproduction clock signal that is a synchronization clock signal for read data.

Also, while the reproduction of the reproduction clock signal is performed based on the synchronization signal SY, since the interval of the synchronization signal SY between adjacent two of the sync frames is kept always fixed as described above, the calculation of the additionally recorded position performed using the above-described reproduction clock signal can be accurately performed.

After write of new data has been started according to the write clock signal whose phase and frequency are always the same and by the use of the synchronization signal SY whose position is predetermined with respect to the position of the LPP signal, the CPU 9 determines whether new data that is to be transferred to the encoder 91 as initially so wanted has finished being written (step S9). Where this new data has not finished being written, the new data continues to be written as is. Where the new data has finished being written, as the final processing to be performed when completing the recording operation, the dummy data 44 corresponding to the entire data portion covering the data in the first sync frame and the data in the second sync frame in the foremost recording sector 40 of the ECC block 30 to be disposed next to the last ECC block 30 of the thus-finished data is recorded successively to this data along with the synchronization information SY and its corresponding ID information 21 (step S10). This way of recording is the same as in the case of the above-described process performed at the time of completing the recording of old data.

Upon completion of the write operation for writing all new data including the additional recording needed at the time of completing the recording operation, the CPU 9 controls the power control circuit 92 without responding to the input data from the encoder 91 so that the strength of the radiation light of the pick-up 60 with respect to the disk may have a prescribed level that serves as the level of read light, and thereby switches the write mode to the read mode (step S11). In this way, additional recording processing of new data is completed.

As described above, according to this embodiment, it is possible to perform smooth and successive recording of new data in succession to written data and also it is possible to perform smooth and successive reproduction of written data and new data without adversely influencing the reproduction of the read clock signal or the detection of the synchronization signal.

Additionally, although in the above-described embodiment an explanation has been given of an example wherein the phase shifter 75 is provided in the PLL circuit 70, the invention is not limited thereto. Namely, it may be arranged in place of providing the phase shifter 75 that the output of the equalizer 102 of the crosstalk eliminating circuit 65 and the output of the LPF circuit 83 of the phase adjusting circuit 80 are added together by an adder 104 and the resulting signal is supplied to the phase shifter 103. When the construction is made like this, it is possible to adjust the phase of the wobble signal becoming a reference for the write clock signal according to the phase difference of the synchronization signal SY with respect to the LPP signal. Therefore, it is possible not only to bring about the same effect as in the case of the above-described example but also to simplify the circuit construction involved.

Also, regarding the position of the synchronization signal SY with respect to the LPP signal, considering the eccentricity component of the disk, it is ideal to perform control so that the LPP signal may come upon the center of the synchronization signal SY. However, substantially the same effect can be obtained even when the LPP signal is so controlled as to come upon the falling edge (the frontward side edge of the synchronization signal pulse) of the synchronization signal SY.

Also, although in the above-described embodiment an explanation has been given of a case where each of the sync frames in the foremost recording sector 40T with respect to which additional recording is performed has new data stored therein, dummy data may be stored in place of new data as disclosed in Japanese Patent Application Laid-Open No. H9-270171.

Also, although in the above-described embodiment an explanation has been given of the DVD-R as a recording medium, the invention can also be applied to another additionally recordable recording medium.

Also, although in the above-described embodiment the sync frame synchronization signal SY has been taken up as an example that serves as the synchronization pulse that is added at intervals of a unit block, it is also possible to implement the present invention even when using as a synchronization pulse another synchronization signal that is disposed in units of a prescribed data block of which the amount of information is different from that in the sync frame.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-152546 filed on Jun. 2, 1998 including the specification, claims, drawings and summary is incorporated herein by reference in its entirety.

What is claimed is:

1. An apparatus for recording information onto a recording medium which has groove track wobbled by a wobble signal having a prescribed frequency and a plurality of synchronization pre-pits, the information being divided into a plurality of sync frames including a synchronization signal, the apparatus comprising:

a wobble detecting circuit for detecting the wobble signal;

a write clock signal generating circuit for generating a write clock signal on the basis of the wobble signal;

a pre-pit detecting circuit for detecting the synchronization pre-pits; and an adjusting circuit for detecting a phase difference between a pre-pit signal output from the detecting circuit and the synchronization signal, and for controlling a frequency of the write clock signal.

2. The apparatus according to claim 1, wherein the adjusting circuit controls the frequency of the write clock signal so that the center of the synchronization signal coincides with an output timing the pre-pit signal.

3. The apparatus according to claim 1 further comprising a crosstalk eliminating circuit for eliminating jitters from the wobble signal on the basis of the pre-pit signal.

4. The apparatus according to claim 3, wherein the crosstalk eliminating circuit includes a divider for performing frequency dividing of the wobble signal, a phase comparator for comparing a phase difference of the frequency-divided wobble signal and the pre-pit signal, and equalizer for smoothing an output of the phase comparator, and a phase shifter for shifting the phase of the frequency-divided wobble signal in accordance with the output signal of the equalizer.

5. A method for recording information onto a recording medium which has groove track wobbled by a wobble signal having a prescribed frequency and a plurality of synchronization pre-pits, the information being divided into a plurality of sync frames including a synchronization signal, the method comprising the processes of:

detecting the wobble signal;

generating a write clock signal on the basis of the wobble signal;

detecting the synchronization pre-pits;

detecting a phase difference between a pre-pit signal output from the detecting circuit and the synchronization signal; and controlling a frequency of the write clock signal.

6. The method according to claim 5, wherein the process of controlling the frequency of the write clock signal controls the frequency of the write clock signal so that the center of the synchronization signal coincides with an output timing the pre-pit signal.

7. The method according to claim 5 further comprising a process of eliminating jitters from the wobble signal on the basis of the pre-pit signal.

8. The method according to claim 7, wherein the process of eliminating jitters comprising the processes of:

performing frequency dividing of the wobble signal;

comparing a phase difference of the frequency-divided wobble signal and the pre-pit signal;

smoothing an output of the phase comparator; and shifting the phase of the frequency-divided wobble signal in accordance with the smoothed output signal.

* * * * *